United States Patent [19]

Costanza

[11] 4,332,460

[45] Jun. 1, 1982

[54] OPTICAL SCANNING CARRIAGE

[75] Inventor: Daniel W. Costanza, Webster, N.Y.

[73] Assignee: Xerox Corporation, Stamford, Conn.

[21] Appl. No.: 155,869

[22] Filed: Jun. 2, 1980

[51] Int. Cl.³ .......................... G03G 15/28; F16F 9/48
[52] U.S. Cl. ........................................ 355/8; 188/289; 267/8 A
[58] Field of Search .................... 355/8; 188/284, 289; 267/8 A

[56] References Cited

U.S. PATENT DOCUMENTS

| | | | |
|---|---|---|---|
| 1,957,308 | 5/1934 | Anderson | 188/289 X |
| 2,553,810 | 5/1951 | Carlson | 188/284 |
| 3,378,878 | 4/1968 | Flint et al. | |
| 3,918,806 | 11/1975 | Cook | 355/8 |
| 3,960,250 | 6/1976 | Wiater | 188/284 X |
| 3,990,687 | 11/1976 | Curnutt | 267/8 A X |
| 4,033,691 | 7/1977 | Bierworth et al. | 355/8 |

FOREIGN PATENT DOCUMENTS 1226833 10/1966 Fed. Rep. of Germany ..... 267/8 A
1403177 8/1975 United Kingdom .

*Primary Examiner*—J. V. Truhe
*Assistant Examiner*—Keith E. George

[57] ABSTRACT

An optical scanning carriage which scans a document and is rapidly returned to the start of scan position is provided with a continuously working positive deceleration device. The device provides a triple mode of operation wherein in the first mode of operation a first maximum flyback velocity is achieved, in a second mode of operation a deceleration profile is achieved and in a final mode of operation a minimum constant velocity of the scanning carriage is achieved. Typically a spring builds up stored energy during the scan cycle which is released through a dashpot having a tapered metering pin connected to a piston forced in motion by the spring which progressively closes off an orifice in the end of a cylinder when the carriage is returned to the start of scan position.

7 Claims, 4 Drawing Figures

OPTICAL SCANNING CARRIAGE

BACKGROUND OF THE INVENTION

This invention relates to optical scanning carriages and particularly to controlling the movement of such a carriage with the use of dashpots. The invention has particular application for use with optical scanning carriages in automatic photocopying machines.

With the the continued development of automatic photocopying machines the desire for higher speed and more compact machines, optical scanning systems with folded optical path such as are used in the Xerox 3100 and 3300 products have been employed. In these systems a document is placed on a platen and optically scanned by a moving carriage. For each copy desired the original document is scanned which means that the processing of successive copies must wait until the scanning mechanism is returned to the start of scan position following scanning the original document for the preceding copy. If the rate of return of the scanning mechanism is the same as the scanning rate the machine will be operating in a non-productive mode one half the time. To reduce this period of non-productive time it has been common to speed up the rate of return of the scanning carriages on the rescan cycle. However, the scanning carriages in these photocopiers carry lamps to illuminate a document while it is being scanned and mirrors to reflect the illuminated images to the imaging member. These lamps, especially when they are hot, are delicate and sensitive to accelerations and may be easily broken. The mirrors if handled too roughly have a tendency to crack but more importantly may be jarred from the precise alignment required for faithful reproduction of the original document. Typically these carriers are driven in one direction by means of cables connected to the main drive through a clutch and returned at much higher speed under the influence of a spring when the clutch is disengaged. At the end of the return scan the carriage collides with a buffer of some type to stop the carriage. While various means have been used to soften the collison and thereby preserve lamps and mirrors, the use of a fixed pneumatic dashpot positioned at the end of the rescan position of the scanning carriages has been the most successful. Typically these dashpots take the form of cylinder and piston arrangements which, while in the extended position, are impacted by the scanning carriage of the optical system in its rescan path shortly before the carriage comes to rest at the start of scan position. This relatively high impact on the scanning carriage while better than no deceleration device, continues to risk the functional integrity of the lamps and mirrors. Under certain conditions it also may increase the operational wear and tear on all the bearing surfaces of the scanning carriage and any rails or other device that the carriage may ride on. It is believed that this is so because the deceleration profile is very abrupt, relying principally on impact of the scanning carriage with the deceleration device which is effective only over a very short distance.

This difficulty may be compounded in automatic copying devices having the capability of reproducing large or oversized original documents in either the same or reduced size. In these copying machines the length of the scanning path may be increased from traditional letter size for example to accommodate the greater dimension of the document. In so doing the scanning carriage is moved further from the dashpot and on the rescan path by the time it contacts the dashpot it is usually traveling at an increased speed due to the increased accelerating force placed on it by the stretched spring. In this mode of operation the probability of damage to the lamps and mirrors is further increased.

DESCRIPTION OF THE PRIOR ART

In addition to the general use of dashpots described above, British Patent Specification No. 1,403,177 describes one in which the dashpot comprises a cylinder closed at one end with a piston moveable in the cylinder, the cylinder having a plurality of apertures spaced between its ends such that as the piston moves toward the beginning of scan position the total area of the apertures available to allow air to escape from the cylinder decreases thereby progressively increasing the damping action of the dashpot. Preferably at least one of the apertures is arranged beyond the end position of the piston. With this construction the damping action of the dashpot increases as successive apertures are covered by the piston, until all the apertures except the last one have been closed after which constant damping is provided until the end of the rescan cycle.

SUMMARY OF THE INVENTION

In accordance with this invention a novel optical scanning carriage is provided. In particular an apparatus with an improved carriage return decelerating mechanism is provided.

The present invention is directed to an optical scanning carriage with means to drive the carriage in a scanning direction and means to rapidly bring the carriage in a rescan direction back to the start of scan position while constantly and progressively decelerating the carriage through the use of a decelerating device having a triple mode of operation wherein in the first mode of operation a first maximum flyback velocity is achieved, in the second mode of operation a deceleration profile is achieved, and in the third and final mode of operation a minimum constant velocity of the scanning carriage is achieved.

More specifically the present invention is directed to an optical scanning carriage with a decelerating dashpot comprising a cylinder having an end plate with a fixed size orifice and a piston slideably moveable within the cylinder from the start of scan position adjacent to the end plate to an end of scan position away from the end plate. The piston has a metering pin mounted on its end which is engagable with the orifice in the cylinder end plate, the pin has a first portion of constant cross sectional shape and area and a second portion tapering from said constant cross sectional shape and area to a point at its end. The orifice in the cylinder end plate is just slightly larger than the shape and area of the first portion of the metering pin. With this construction as soon as the carriage has completed its movement in the scanning direction a drive means is actuated to rapidly return the carriage to the start of scan position. During its entire path to the start of scan position the decelerating device acts to effectively and progressively decelerate the carriage. In the first instance with the metering pin not being engaged in the orifice the piston forces a constant volume of air through the orifice thereby establishing an initial maximum flyback velocity. Once the tapered metering pin commences to enter the orifice the amount of air which may be released from the cylinder progressively decreases as a result of the progressive reduction in available cross sectional area in the orifice. In the final stage a second constant velocity, a minimum velocity, is achieved with the metering pin when the constant shape and area portion of the pin enters the orifice. Typically the available cross sectional area in the orifice is very small so that the scanning carriage has almost slowed to a complete stop. In this three step fashion a fast traveling scanning carriage may be rapidly and safely decelerated in step wise manner without damage to the lamps and mirrors.

In a significant aspect of the present invention a spring mounted within the dashpot is used to provide the drive means to drive the scanning carriage from the end of scan position to the start of scan position. This is accomplished by compressing the spring during the scanning cycle so that at the end of the scanning cycle when the spring is released it provides the force to drive the scanning carriage back to the start of scan position. In a copying device capable of scanning original documents of various sizes the scanning carriage need be driven in the scanning direction only as far as necessary for the length of the original documents. With the capability of having different original document scan lengths, different energy levels may be reached in the rescan spring as it is compressed during the rescanning cycle. By being an active deceleration device throughout the entire maximum scanning range the present invention is capable of absorbing the various amounts of energy stored within the system. This is accomplished by controlling the total deceleration profile over the maximum possible carriage scan length. Thus the energy stored in the rescan spring which is dependent upon its degree of compression and varies with its compression may be dissipated in a controlled manner irrespective of the particular amount of stored energy.

Accordingly, it is an object of the present invention to provide an improved scanning carriage deceleration device.

It is a further object of the present invention to provide an optical scanning carriage with a controlled deceleration profile.

It is a further object of the present invention to provide an optical scanning carriage capable of scanning different lengths and smoothly returning to the start of scan position.

It is an additional object of the present invention to provide a decelerating device for an optical scanning carriage which is engaged to and decelerates the scanning carriage over the entire rescan path.

It is an additional object of the present invention to provide a dashpot which is capable of dissipating different levels of stored energy.

For a better understanding of the invention as well as other objects and further features thereof reference is made to the following drawings and descriptions.

DESCRIPTION OF PREFERRED EMBODIMENT

The invention will now be described by reference to a preferred embodiment of the optical scanning carriage and deceleration device.

Figure 1:
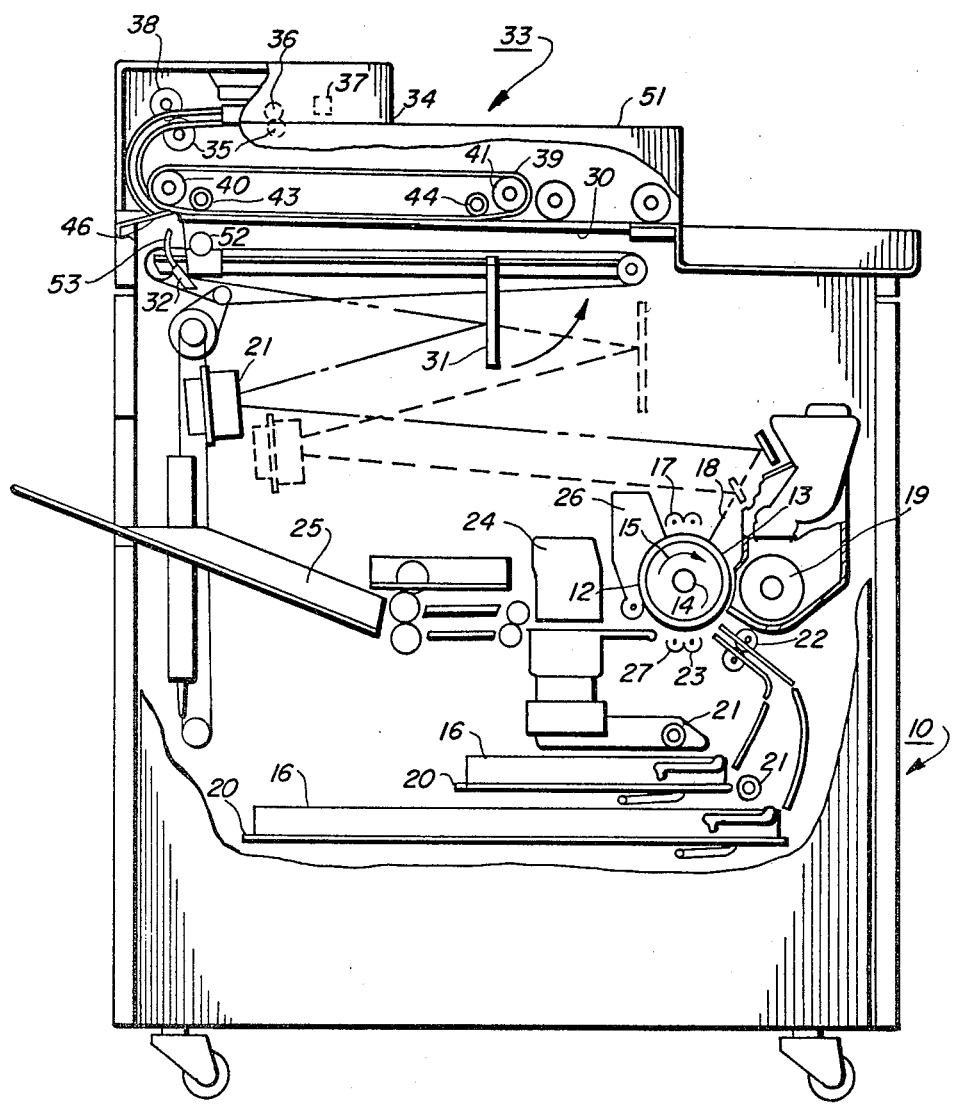
FIG. 1 is a schematic representation of an automatic xerographic reproducing machine employing an optical scanning carriage and deceleration device of the present invention.

Referring now to FIG. 1, there is shown by way of example an automatic xerographic reproduction machine 10 which includes the optical scanning carriage and deceleration device of the present invention. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment or embodiments shown herein.

The reproducing machine 10, illustrated in FIG. 1 employs an image recording drum-like member 12, the outer periphery of which is coated with a suitable photoconductive material 13. The drum 12 rotates about shaft 14 in the direction indicated by arrow 15 to bring the image-bearing surface 13 thereon past a plurality of xerographic processing stations.

The drum 12 moves the photoconductive surface 13 through a charging station 17 where an electrostatic charge is placed uniformly over the photoconductive surface 13. Thereafter, the drum 12 is rotated to exposure station 18 wherein the charged photoconductive surface 13 is exposed to a light image of the original input scene information whereby the charge is selectively dissipated in the light exposed regions to record the original input scene in the form of an electrostatic latent image. After exposure, drum 12 rotates the electrostatic latent image recorded on the photoconductive surface 13 to development station 19 wherein a conventional developer mix is applied to the photoconductive surface 13 of the drum 12 rendering the latent image visible.

Sheets 16 of the final support material are supported in a stack arrangement on an elevating stack support tray 20. With the stack at its elevated position a sheet separator 21 feeds individual sheets therefrom to the registration system 22. The sheet is then forwarded to the transfer station 23 in proper registration with the image on the drum. The developed image on the photoconductive surface 13 is brought into contact with the sheet 16 of final support material within the transfer station 23 and the toner image is transferred from the photoconductive surface 13 to the contacting side of the final support sheet 16. Following transfer of the image the final support material which may be paper, plastic, etc., as desired, is transported through detack station where detack corotron 27 uniformly charges the support material to separate it from the drum.

After the toner image has been transferred to the sheet of final support material 16 the sheet with the image thereon is advanced to a fuser 24 which coalesces the transferred powder image thereto. After the fusing process the sheet 16 is advanced to a suitable output device such as tray 25. The residual toner particles remaining on the photoconductive surface 13 after the transfer operation are removed from the drum 12 as it moves through a cleaning station 26.

The document handler 33 includes as an input station, a sheet feed table 51, a copying sheet receiving slot 34, sheet alignment feed roll 35 and cooperating pinch device 36. When a sheet is inserted it makes switch 37 which activates sheet alignment roll 35 which feeds the sheet forward and aligns it against the rear or side registration edge of the document handler. The pinch rolls 38 are activated when a switch is made to feed a document around the 180° curved guides onto the platen 30. The platen belt transport is comprised of a single wide belt 39 having one run over the platen 30. The belt 39 is wrapped about two pulleys 40 and 41 which are arranged such that the belt surface at the bottom of the pulley with the assistance of input backup roll 43 and output backup roll 44 is in light contact with the platen. The document is driven by the belt 39 across the platen until the trailing edge of the document has cleared registration edge 46 after which the platen belt transport is stopped and the direction in which the document is driven is reversed so that it is registered against registration edge 46 and is now ready for copying.

Figure 2:
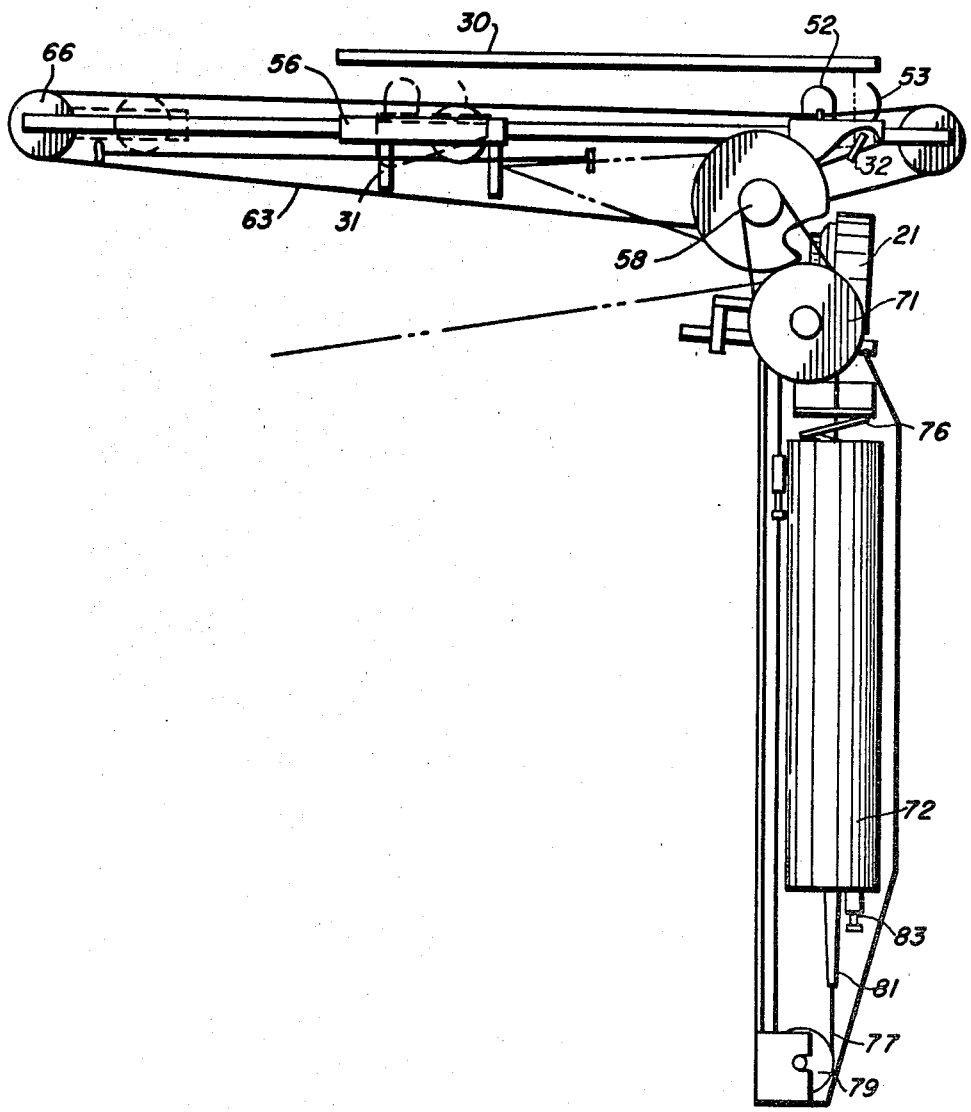
FIG. 2 is a side view of the optical scanning carriage and deceleration device of the present invention.
Figure 3:
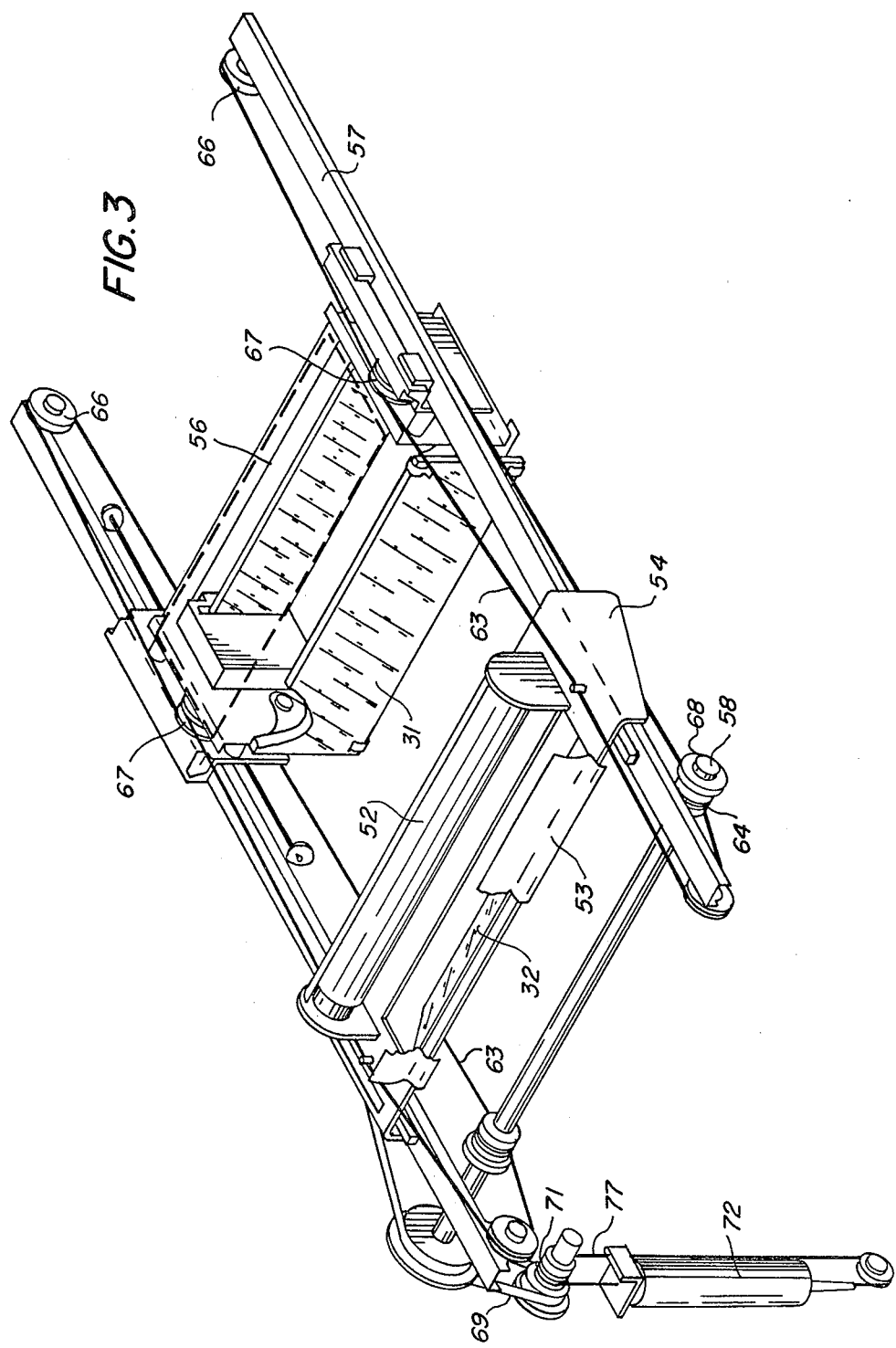
FIG. 3 is an isometric view from the front of the optical scanning carriage and deceleration device of the present invention.

The optical system will now be described with further detail and with additional reference to FIGS. 2 and 3. In the base mode of operation the copier is operated to faithfully produce a copy of a document which is placed image side down upon a horizontal transport viewing platen 30. This is accomplished by the full rate mirror 32 scanning the entire original document. Positioned in the scanning carriage with the full rate mirror are the illuminating lamp 52 and the object reflector 53. As the full rate mirror scans the original document on the platen 30 the half rate mirror 31 moves at one half the rate of the full rate mirror to maintain the object to lens conjugate equal to the lens to image conjugate of the system. Typically the length of the scan of the full rate mirror is the length of a normal letter size document. With larger oversize documents clearly the length of scan of the full rate mirror must be at least as large as the document and the half rate scanning mirror must also be moved an additional distance at one half the rate of the full rate mirror to maintain the object conjugate equal to the image conjugate.

In the reduction mode of operation the lens 21 is translated to a different position shown in phantom in FIG. 1 to alter the object conjugate/image conjugate relationship. In this operational mode the object to lens conjugate is larger than the lens to image conjugate thereby providing an image of reduced magnification on the imaging surface.

Both the full rate mirror carriage 54 which also contains the illuminating lamp 52 and the reflector 53, and the half rate mirror carriage 56 ride on optical guide rails 57 and are driven through the optics drive shaft 58 which is driven from a main drive belt from the machine main drive motor (not shown). The carriages are driven on both sides from the optics shaft 58 by means of cables 63. The cable 63 is coiled around capstan 64 and is wrapped around optics idler wheels 66. With the arrangement shown in FIG. 3 the cable is wrapped around idler wheel 67 which is fixed to and transports the half rate carriage such that for each unit of movement of the full rate carriage the half rate carriage moves one half the unit distance. In this manner the total object conjugate is maintained constant.

Once the optics drive shaft 58 and the clutch 68 are engaged, the main drive system through the optics drive shaft also serves to arm the deceleration device of the present invention. As the optics drive shaft 58 drives the optical scanning carriages it arms the decelerating device through drive belt 69 and capstan 71.

The decelerating device comprises an elongated cylinder 72 having a piston 73 with an end plate 74 contained within the cylinder. Housed within the cylinder 72 and pushing against the end plate 74 is spring 76. The piston is connected to the capstan by means of cable 77 so that as the optical scanning carriages are driven in the rescanning direction the cable 77 is wound up around capstan 71 drawing the piston together with the spring up to the top of cylinder 72. The end plate 74 of piston 73 fits within the cylinder 72 such that there is substantially no air leakage between the walls. This provides an air compression cylinder on the down side of the piston end plate 74 between it and the end of the cylinder 72 which has a small fixed size orifice 78 therein. Fixed to the end plate 74 is a metering pin 81 which is positioned for engagement with the orifice 78. The end of the metering pin is connected to cable 77 which is wrapped around pulley 79 and returned to the top of the deceleration device to be wrapped around capstan 71.

In operation the optics drive shaft 58 which is driven by the main drive, drives the scanning carriages and at the same time pulls the piston end plate 74 up to the top of the cylinder 72 thereby compressing the spring 76. At the end of scan position of the scanning carriages the clutch 68 is disengaged, the stored energy in the spring 76 is released with the piston end plate 74 driven down within the cylinder. As the piston is driven down through belt 69 it drives the optics drive shaft in a rescan direction to return both optic carriages to the start of scan position.

With the spring driving the piston end plate 74 down the metering pin 81 enters the orifice 78 thereby providing a damping function on the forced spring return of the scanning carriages.

Figure 4:
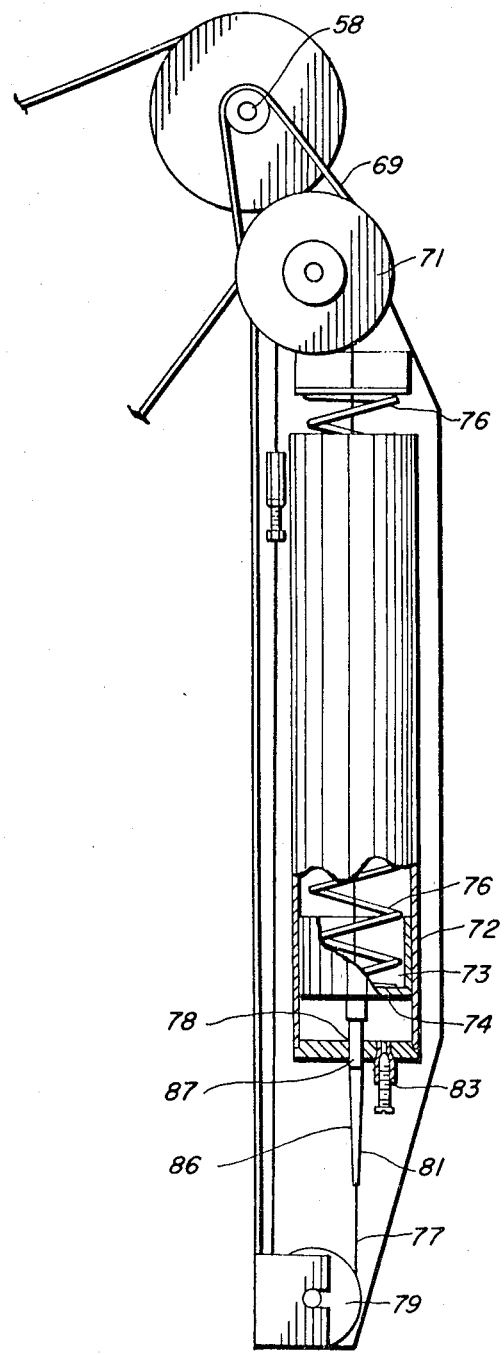
FIG. 4 is a cross section of the decelerating device of the present invention.

When the scanning carriages are at the end of scan position and the spring is driven up by the piston end plate into a highly compressed state the metering pin is completely within the confines of the cylinder 72. On the rescan cycle as the spring releases the energy it has stored the dashpot provides a triple mode of operation. In the first mode with the metering pin still within the cylinder, a constant cross section in the orifice is available for escaping air and this provides a first maximum velocity for the rescan in that as the end plate of the piston moves down the same amount of air escapes per unit of movement. As shown in FIG. 4 the metering pin 81 has a tapered portion 86 at its end tapering from a point at the very end to a portion 87 of constant diameter thickness. Therefore as the metering pin enters the orifice it gradually reduces the cross sectional area from which air may escape and in this manner progressively reduces the amount of air escaping and thereby progressively dampens the return of the piston end plate and thereby the return of the scanning carriages. A second portion 87 of the metering pin has a constant cross sectional area just slightly smaller than the orifice to thereby provide a minimum velocity with which the end plate and thereby the scanning carriages return to their respective start of scan positions. This mating of the orifice and the metering pin may be such that the final portion of the rescan cycle actually forces very little air from the orifice. To more fully control this portion of the rescan cycle a small adjustable release valve 83 is positioned at the bottom of the cylinder. With this valve the precise amount of air released may be accurately regulated so that the scanning carriages smoothly return to the start of rescan position without damaging or altering the position of the lamps or mirrors in any way.

The relative sizes of the orifice and the metering pin may be readily selected or determined given the specific requirements of the system requiring their use.

The above described device unlike prior art devices is always tied to the scanning carriage and on rescan of the carriage to the start of scan position provides a smooth, orderly, relatively impact free deceleration cycle. The system is capable of releasing or dissipating various amounts of energy stored in the spring as a result of it being compressed to varying degrees depending on different scan lengths. While the energy stored is a function of the mass of the scanning carriage, the spring rate and the velocity of the carriage, at any given time the deceleration device positively acts to dampen the return to the start of scan position. In this manner it provides a single dashpot capable of being used for all scan lengths since it provides a damping function over the entire rescan cycle for all stored energy levels. Thus in the longest end of scan position the dashpot has the highest stored energy level and at the start of scan position has no stored energy. Throughout the entire distance on the rescan cycle the dashpot provides a positive damping to the scanning carriages.

It will be appreciated that the described device may be modified and varied by the skilled artisan upon a reading of the present disclosures. These are intended to be within the scope of the present invention.

I claim:

1. An optical scanning carriage, including drive means to move said carriage in a scanning direction and means to rapidly move said carriage in a rescan direction back to the start of scan position, dashpot means to decelerate the rate of return of the scanning carriage to the start of scan position, said dashpot comprising a cylinder having an end plate at one end, said end plate having a fixed size orifice therein, a piston slidably movable within the cylinder from a start of scan position adjacent the end plate to an end of scan position away from the end plate, the piston having a tapered metering pin mounted on its end, said metering pin being engagable with the orifice in the cylinder end plate, the end of said metering pin being spaced from the cylinder end plate when said carriage is in the end of scan position and being inserted in the orifice of said end plate when said carriage is in the start of scan position, said metering pin having a first portion of constant cross sectional shape and area and a second portion tapering from said constant cross sectional shape and area to a point at its end, said orifice having a shape and area slightly larger than the shape and area of said first portion of said metering pin whereby when said piston moves in the rescan direction said dashpot provides a triple mode of operation comprising a first maximum flyback velocity by the action of the piston and the orifice only, a second deceleration profile as the tapered metering pin enters the orifice in the end plate and a third minimum constant velocity when the constant shape and area portion of the metering pin enters the orifice in the end plate.

2. An optical scanning carriage according to claim 1 wherein said means to move said carriage rapidly in a rescan direction comprises a spring mounted behind the piston and within the cylinder of the dashpot.

3. An optical scanning carriage according to claim 2 wherein in said rescan position said spring continuously urges said piston into said cylinder to decelerate the scanning carriage during the entire rescan path.

4. The optical scanning carriage according to claim 1 wherein said orifice in said end plate is circular and said tapered metering pin is circular in cross section.

5. The optical scanning carriage according to claim 4 wherein said end plate has an adjustable release valve adjacent said orifice.

6. The optical scanning carriage according to claim 1 including a first mirror carriage and a second lamp and mirror carriage, said drive means providing a rate of movement of said mirror carriage one half the rate of movement of said lamp and mirror carriage and wherein the decelerating action of said dashpot is effective to stop both said carriages.

7. The optical scanning carriage according to claim 1 wherein the end of said piston opposite the end with the metering pin is connected to said carriage drive means.

* * * * *